United States Patent

Hübner et al.

[11] Patent Number: 4,594,568
[45] Date of Patent: Jun. 10, 1986

[54] PERMANENT MAGNETIC CHARGE TAKING OR HOLDING DEVICE

[76] Inventors: Klaus-Dieter Hübner, Gotenstrasse 152, 5840 Schwerte; Dieter Oettinghaus, Im Kirchenberg 21, 5800 Hagen; Wolfram Stanek, Bergstrasse 10, 5401 Hungenroth, all of Fed. Rep. of Germany

[21] Appl. No.: 748,427

[22] Filed: Jun. 25, 1985

[30] Foreign Application Priority Data

Jun. 26, 1984 [DE] Fed. Rep. of Germany ....... 3423482

[51] Int. Cl.$^4$ ................................................ H01F 7/20
[52] U.S. Cl. ..................................... 335/289; 335/291
[58] Field of Search ............... 335/285, 289, 291, 294, 335/295; 269/8

[56] References Cited

U.S. PATENT DOCUMENTS

| 2,348,967 | 5/1944 | Duby | 335/291 X |
| 3,316,514 | 4/1967 | Radus et al. | 335/291 |
| 3,978,441 | 8/1976 | Sobottka et al. | 335/289 X |
| 4,356,467 | 10/1982 | Cardone et al. | 335/289 X |

Primary Examiner—George Harris
Attorney, Agent, or Firm—Cushman, Darby & Cushman

[57] ABSTRACT

The invention is directed to an electrically controllable permanent magnetic quick break switching system for raising, transporting and stacking ferromagnetic parts. The system includes a magnetized permanent magnet 1 centrally arranged in the direction of its smallest dimension in a magnetically conducting iron support member, on which magnet there sits a magnetically conducting compensation plate 5 having a magnetically conducting bar 3 and magnetically conducting central pole 6 and additionally an electrical coil 4 between the compensation plate and the control pole for compensation (displacement) of the magnetic field from the region of the working air gap 7. For optimum compensation, i.e., of the most extensive delay free releasing of ferromagnetic thick to thinnest parts with simultaneously high forces the structural dimensions of the system are in reciprocal relationships which are individually stated in claim 1.

1 Claim, 1 Drawing Figure

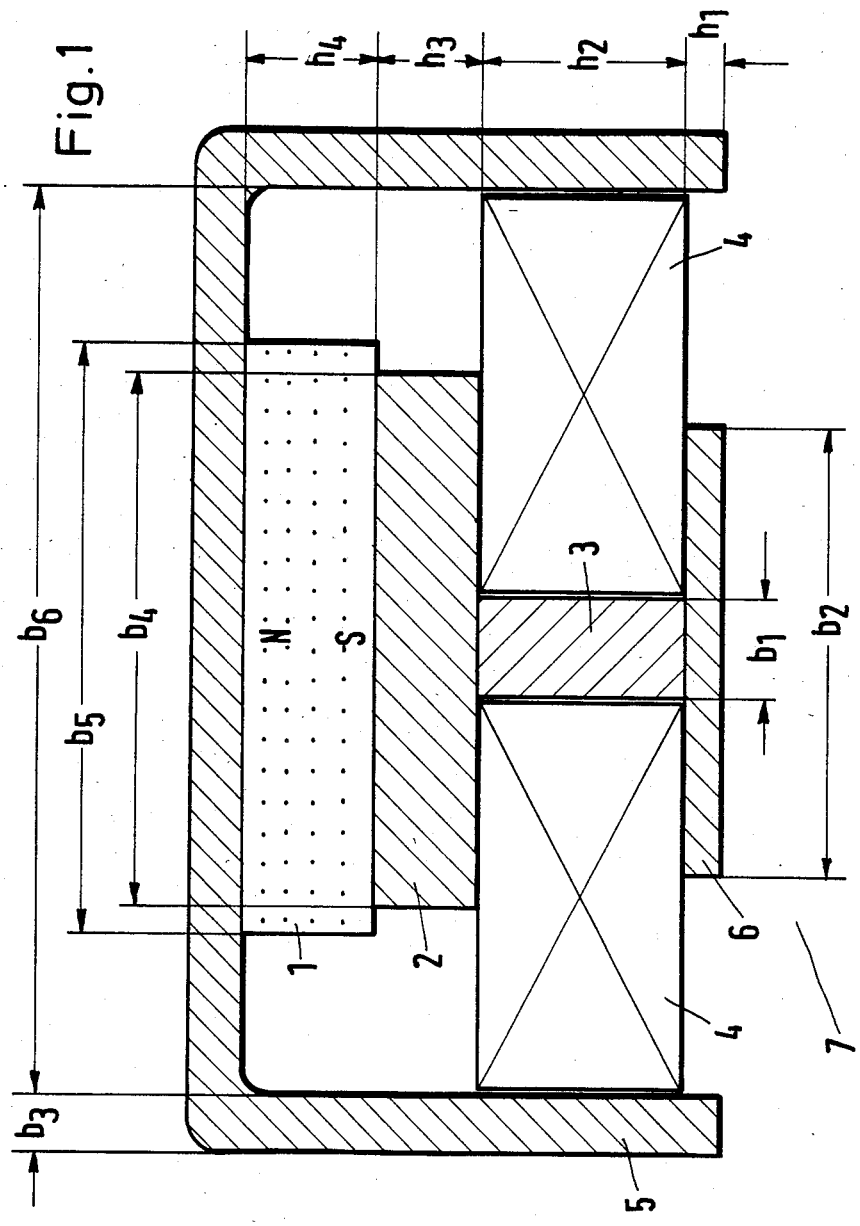

PERMANENT MAGNETIC CHARGE TAKING OR HOLDING DEVICE

BACKGROUND OF THE INVENTION

The invention is directed to an electrically controllable permanent magnet load taking or holding device for raising, transporting and stacking ferromagneted parts. The device includes a magnetized permanent magnet centrally arranged in the direction of its smallest dimension in a magnetically conducting iron support member, on which magnet there sits a magnetically conducting compensation, (or complementing) plate having a magnetically conducting bar and magnetically conducting central pole. The device further includes an electrical coil between the compensation plate and the central pole for compensation (displacement) of the magnetic field in the area of the working air gap. This load taking and holding device serves for optimum compensation, i.e., for the most extensive delay free dropping of ferromagnetic thick to thinnest parts having at the same time high holding forces.

There are great difficulties in building permanent magnetic load taking and holding devices, especially for the suspended transfer of sheets in such a manner that they at one time bring about the holding of very thin sheets and at another time of thick sheets during conveying. Then this conveying can only be fulfilled if the holding forces of the load taking and holding device are adjusted to the thickest dimension of the sheet to be encountered in under that even thick sheets can be held safely. On the other hand this means that it is extraordinarily difficult to render these large holding forces inactive in the shortest possible time which is prerequisite for a desired release of the sheet. It is already known to deactivate the permanent magnetic holding force externally by producing an opposing field by an electrical coil which suppresses the permanent magnet flux in a side flux (Schuler/Brinkmann: "Dauermagnet-Werkstaffe und Anwendungen", 1970, page 547 et seq.). With magnetic devices of this type it was possible to stack either only the thinnest sheets or only thick sheets.

The object of the invention is to provide a low taking or holding device with which it is possible to allow sheets to be released independent of their volumes, especially of their thickness, with the least possible delay.

SUMMARY OF THE INVENTION

The problem to be solved is to improve a permanent magnet load taking or holding device of the type mentioned at the beginning which even with the largest holding forces safely releases the thinnest and thick sheets and is attained in short switching times. Thereby the internal leakage flux of the device should be minimal and the necessary electrical compensation energy should be as small as possible.

To solve this problem there is proposed according to the invention with a permanent magnetic load taking or holding device of the type mentioned at the beginning that the structural dimensions be in the ratios, allined to each other mentioned in claim 1. Specifically these ratios are:

(1) $\dfrac{b_5}{b_6} = \dfrac{0.5 \text{ to } 0.75}{1}$ (2) $\dfrac{b_4}{b_5} = \dfrac{0.8 \text{ to } 1.0}{1}$ (3a) $\dfrac{b_1}{b_1} = \dfrac{0.15 \text{ to } 0.2}{1}$ for ferritic permanent magnets (3b) $\dfrac{b_1}{b_5} = \dfrac{0.4}{1}$ for permanent magnets of rare earth - cobalt alloys (4) $\dfrac{b_2}{h_3} = \dfrac{0.9 \text{ to } 1.1}{1}$ (5) $\dfrac{b_3}{b_2} = \dfrac{0.1 \text{ to } 0.15}{1}$ (6) $\dfrac{b_3}{b_2} = \dfrac{0.1 \text{ to } 0.15}{1}$ (7a) $\dfrac{h_4}{b_5} = \dfrac{0.15 \text{ to } 0.1}{1}$ for ferritic permanent magnets (7b) $\dfrac{h_4}{b_5} = \dfrac{0.05 \text{ to } 0.1}{1}$ for permanent magnets of rare earth - cobalt alloys (8) $\dfrac{h_2}{b_5} = \dfrac{0.3 \text{ to } 0.4}{1}$ (9) $\dfrac{h_1}{b_1} = \dfrac{0.25 \text{ to } 0.4}{1}$ These relationships are shown in the drawings.

Based on calculation and through experiments it has been established that all given and required ratios of dimensions must be adhered to in order to solve the stated problem. Particularly the load taking and holding device of the invention fulfills the following conditions:

(1) Optimum flux suppression in the release phase both for the thinnest and thick sheets.

(2) In spite of higher holding forces minimal electrical concentration of energy.

There are two possibilities for the concrete construction of the device. Symmetrical rotation or rectangular structural system. With rectangular systems the longitudinal dimension can be adjusted to the sheet spectrum for transporting.

In combination with a suitable electronic switch, e.g., such a device can have a structure volume 2300 cm$^3$ and can carry out more than 200 switchings on and off per minute.

According to a preferred illustrative form of the load taking or holding device of the invention the switching coil in the compensation case should be operated with increased voltage and additional current limits. Through that the actual current strength in the switching coil can be brought to the theoretical value in the shortest possible time.

BRIEF DESCRIPTION OF THE DRAWING

The single FIGURE of the drawing is a cross section of the charge taking or holding device of the invention.

DETAILED DESCRIPTION

In the drawing 1 designates a permanent magnet magnetized over its smallest dimension, 2 the compensation plate applied on a pole surface (in the FIGURE the S-pole) and 3 the conducting bar, both made of magnetically conducting material, 4 the electrical compensation coil, 5 the jar showed iron support member, which surrounds the entire structure parts of the system, 6 the magnetically conducting center pole and 7 the working air gap. The width and height dimensions set forth in claim 1 are designated in the FIGURE with b, to be respectively. For practical construction of the magnet system there suffices knowledge or determination of the width $b_5$ of the permanent magnet 1 of the system. With $b_5$ there can be calculated all the remaining sizes of the dimensions stated in claim 1.

The entire disclosure of German Application P 3423482.9 is hereby incorporated by reference.

What is claimed is:

1. In an electrically controllable permanent magnet load taking or holding device for raising, transporting and stacking ferromagnetic parts comprising a magnetized permanent magnet centrally arranged in the direction of its smallest dimension in a magnetically conducting iron support member, a magnetically conducting compensation plate having a magnetically conducting bar and a magnetically conducting pole on said magnet, and an electrical coil between the compensation plate for compensation of the magnetic field in the area of the working air gap the improvement comprising maintaining the following relationship of the structural dimensions.

(1) $\dfrac{b_5}{b_6} = \dfrac{0.5 \text{ to } 0.75}{1}$ (2) $\dfrac{b_4}{b_5} = \dfrac{0.8 \text{ to } 1.0}{1}$ (3a) $\dfrac{b_1}{b_1} = \dfrac{0.15 \text{ to } 0.2}{1}$ for ferritic permanent magnets (3b) $\dfrac{b_1}{b_5} = \dfrac{0.4}{1}$ for permanent magnets of rare earth - cobalt alloys (4) $\dfrac{b_2}{h_3} = \dfrac{0.9 \text{ to } 1.1}{1}$ (5) $\dfrac{b_3}{b_2} = \dfrac{0.1 \text{ to } 0.15}{1}$ (6) $\dfrac{b_3}{b_2} = \dfrac{0.1 \text{ to } 0.15}{1}$ (7a) $\dfrac{h_4}{b_5} = \dfrac{0.15 \text{ to } 0.1}{1}$ for ferritic permanent magnets (7b) $\dfrac{h_4}{b_5} = \dfrac{0.05 \text{ to } 0.1}{1}$ for permanent magnets of rare earth - cobalt alloys (8) $\dfrac{h_2}{b_5} = \dfrac{0.3 \text{ to } 0.4}{1}$ (9) $\dfrac{h_1}{b_1} = \dfrac{0.25 \text{ to } 0.4}{1}$ where b is the width of the conducting bar,
$b_2$ is the width of the conducting plate,
$b_3$ is the distance between the inner and outer surface of the iron support member,
$b_4$ is the width of the conducting plate,
$b_5$ is the width of the permanent magnet,
$b_6$ is the distance between the opposite inner surfaces of the iron support member,
$h_1$ is the height of the iron support member from its outer edge to the electrical compensation coil,
$h_2$ is the height of the electrical compensation coil,
$h_3$ is the height of the conducting bar, and
$h_4$ is the height of the permanent magnet.

* * * * *